United States Patent Office 3,687,617
Patented Aug. 29, 1972

3,687,617
PROCESS FOR REDUCING THE THIOUREA CONTENT OF ALKALI- AND ALKALINE EARTH-METAL RHODANIDES
Hans-Dieter Rupp, Mozartstrasse 1, Erlenbach, Germany; Gerhard Meyer, Blumenstrasse 26, Obernburg Germany; and Helmut Mägerlein, Seeweg 48, Erlenbach, Germany
No Drawing. Filed Sept. 1, 1970, Ser. No. 68,764
Claims priority, application Germany, Sept. 6, 1969, P 19 45 178.6
Int. Cl. C01c 3/20
U.S. Cl. 423—178                               9 Claims

ABSTRACT OF THE DISCLOSURE

The content of thiourea as an impurity in alkali and alkaline earth metal rhodanides is reduced by heating the impure or crude rhodanide in an aqueous solution at elevated pressures and temperatures to convert most of the thiourea into gaseous reaction products, which can then be easily separated or driven off from the reaction mixture in order to recover a highly purified rhodanide.

---

Ammonium rhodanide which has been produced by the reaction of ammonia and carbon disulfide or from hydrocyanic acid is always contaminated with thiourea. When re-salting the ammonium rhodanide into alkali or alkaline earth metal rhodanide, the thiourea is again found as an impurity in the rhodanide solution or in the solid alkali or alkaline earth metal rhodanide after evaporation and crystallization of the solution. For example, technical sodium rhodanide may contain about 0.2% by weight of thiourea. Since it is quite common for technical reasons to obtain a very pure rhodanide, especially in the production of sodium rhodanide and with particular regard to sulfur-containing impurities, it is considered essential to separate and remove the thiourea.

According to one known process, a sodium rhodanide solution containing thiourea as an impurity is reacted with hydrogen peroxide. In this case, the thiourea reacts to form urea and sulfuric acid, this latter compound after neutralization with a caustic soda solution being precipitated and isolated by addition of barium rhodanide to form an easily filterable barium sulfate. However, on the other hand, the urea remains in the sodium rhodanide solution or in the solid sodium rhodanide as an impurity which is quite difficult to remove. Therefore, in this known process, one can obtain a sodium rhodanide which contains very little of the original thiourea impurity but not a pure sodium rhodanide since it still contains substantial amounts of urea as a still undesirable impurity.

One object of the present invention is to provide a process in which thiourea can be effectively separated from alkali and alkaline earth metal rhodanides, i.e. so as to substantially reduce the thiourea content of the initially impure rhodanide. Another object of the invention is to provide a process for the purification of the initial rhodanide in a substantially continuous manner as well as with batch procedures. Most importantly, it is an object of the invention to purify the initial thiourea-containing rhodanide in such a manner that very little if any sulfur-containing impurity is left as a residue in either a rhodanide solution or the solid rhodanide product. These and other objects and advantages of the invention will become more apparent upon consideration of the following detailed specification.

In accordance with the invention, it has now been found that a highly improved reduction of the thiourea content of alkali and alkaline earth metal rhodanides can be achieved by a process which includes the step of heating an aqueous solution of the initial impure rhodanide at an elevated pressure and at an elevated temperature of about 170° to 200° C.

In this heating step, the thiourea is converted into hydrogen sulfide, ammonia and carbon dioxide in accordance with the following equation:

$$SC(NH_2)_2 + 2H_2O \rightarrow H_2S + 2NH_3 + CO_2$$

Thus, in the process according to the invention, the thiourea is converted almost entirely into gaseous reaction products which can then be very easily separated from the reaction solution. Under the prescribed temperature conditions of the reaction, the alkali and alkaline earth metal rhodanides in the reaction solution are not decomposed. In this respect, the process of the invention is especially advantageous as applied to the impure rhodanides of sodium, potassium, calcium or barium. Accordingly, these particular alkali and alkaline earth metal rhodanides are especially preferred in carrying out the process of the invention.

As to the temperature range of this process, it has been found that the hydrolysis of the thiourea according to the above-noted reaction equation begins at about 160° C. It has further been proven that this hydrolysis is capable of being carried out at a satisfactory reaction rate at a temperature of about 170° C. On the other hand, at reaction temperatures above 200° C., the desired rhodanide product such as sodium rhodanide begins to decompose in the aqueous solution. Therefore, temperatures substantially below 170° C. should ordinarily be avoided in favor of a more satisfactory speed of the reaction while temperatures substantially above 200° C. should be avoided.

Since aqueous solutions are employed in the process according to the invention, it is necessary to work under an elevated pressure in order to achieve the desired reaction temperature of approximately 170–200° C. In general, it is most convenient to work at those elevated pressures which correspond to the reaction temperature, i.e. those pressures which are dependent upon the concentration of the rhodanide solution and also upon the content of thiourea due to the formation of certain amounts of gaseous reaction products from this impurity. Thus, the minimum pressure required for the process naturally corresponds to the saturation pressure of the employed rhodanide solution at the particular reaction temperature. By way of illustration, a few of these minimum values of the saturation pressure are set forth in the following table:

TABLE

| Temp. (° C.) | Rhodanide | Concentration of the solution (percent by wt.) | Saturation pressure kg./cm.² (guage)* |
|---|---|---|---|
| 170 | NaSCN | 30 | 5.2 |
| 180 | NaSCN | 30 | 6.5 |
| 190 | NaSCN | 30 | 8.2 |
| 170 | NaSCN | 57 | 3.2 |
| 180 | NaSCN | 57 | 4.2 |
| 190 | NaSCN | 57 | 5.0 |
| 170 | Ca(SCN)₂ | 30 | 5.7 |
| 180 | Ca(SCN)₂ | 30 | 7.5 |
| 190 | Ca(SCN)₂ | 30 | 9.8 |
| 170 | Ba(SCN)₂ | 30 | 6.75 |
| 180 | Ba(SCN)₂ | 30 | 8.8 |
| 190 | Ba(SCN)₂ | 30 | 11.4 |

*All numerical values for the saturation pressure are set forth herein as an atmospheric excess pressure, i.e. the pressure above one atmosphere measured in kg./cm.², commonly referred to as the gauge pressure.

For economical reasons it is of course desirable to carry out the inventive process at a pressure which lies only slightly above this minimum pressure corresponding to the saturation pressure of a particular rhodanide solution in water. However, higher pressures can also be used without having any substantial disadvantage other than the increased cost of operating at such higher pressures.

A heating period of about approximately 15 minutes is generally sufficient to substantially decompose the thiourea under the above-noted process conditions. It has been found to be especially advantageous not to exceed a heating period of about 45 minutes.

The rhodanide solutions employed in the process of the invention can be used in very broad concentrations, including very slight concentration. If the initial impure alkali or alkaline earth metal rhodanide containing the thiourea is a solid material, it is preferable to achieve the highest possible concentration of the aqueous solution and then treat this concentrated solution of the rhodanide by heating under pressure in accordance with the invention. On the other hand, it is also quite suitable to employ those aqueous solutions which are obtained in the conventional technical production of alkali and alkaline earth metal rhodanides, these solutions generally exhibiting a content of approximately 30 to 50% by weight of the rhodanide.

In contrast to the above-described known process, which must be conducted in a discontinuous manner, the process according to the present invention can be carried out in a number of different ways, including a continuous process as well as one which is discontinuous. Thus, it has been proven to be particularly advantageous to continuously heat the reaction solution, for example in an elongated reaction tube and then to continuously expand or release the pressure on the solution whereby it comes to a boil and the dissolved, gaseous hydrolysis products are driven off. The remaining aqueous solution can then be evaporated and crystallized for recovery of the purified rhodanide product as a solid residue, while the mother liquor is again recycled into the hydrolysis process or heating step of the invention. Since the desired reaction for conversion of the thiourea impurity into gaseous or gas-forming products proceeds at a reasonably rapid rate under the conditions of the invention, a continuous process is quite feasible from a commercial viewpoint.

The alkaline or alkaline earth metal rhodanides which are purified and recovered according to the process of the invention are obtained with a final residual content of thiourea of less than 10 p.p.m. This represents a very highly purified product in comparison to the usually large content of thiourea in most technical or commercial rhodanides.

The process of the invention is further illustrated but not restricted to the following examples.

EXAMPLE 1

A 30% by weight aqueous solution of a crude sodium rhodanide which is contaminated with 1800 p.p.m. of thiourea is heated in an autoclave at 185° C. and maintained at this temperature for a period of 30 minutes so as to result in a pressure of 7.5 kg./cm.$^2$ (gauge). The autoclave is then released from the pressure, whereby the contents come to a boil and the gaseous hydrolysis products are driven off. After concentration of the solution by evaporation and crystallization in a conventional manner, a solid sodium rhodanide is obtained with a content of only 3 p.p.m. of thiourea. The mother liquor is then treated together with fresh 30% by weight sodium rhodanide solution in the same manner as described above and yields sodium rhodanide with a content of 2 p.p.m. of thiourea.

EXAMPLE 2

A 60% by weight aqueous solution of sodium rhodanide, which is contaminated with 1800 p.p.m. of thiourea, is heated in an autoclave at 170° C. for a period of 30 minutes, whereby the pressure is raised to about 3.0 kg./cm.$^2$ (gauge). The resulting reaction solution and the mother liquor are then worked up in the same manner as described in Example 1. The solid sodium rhodanide recovered in this manner contains only 5 p.p.m. of thiourea.

EXAMPLE 3

A 30% by weight aqueous solution of sodium rhodanide, which is contaminated with 600 p.p.m. of thiourea is continuously heated in a double walled reaction tube at 190° C. The average residence time of the solution in the reactor amounts to 15 minutes. A pressure of 12 kg./cm.$^2$ (gauge) is maintained in the tube by means of a suitable pressurizing valve. The superheated sodium rhodanide solution is continuously expanded into a receiver wherein the solution comes to a boil so that the gaseous products of the hydrolysis reaction are driven off. From this receiver, the purified sodium rhodanide solution is concentrated either continuously or discontinuously. After separation of the solid sodium rhodanide from the concentrated solution, the mother liquor is again recycled into the continuously operated reaction tube, preferably together with an amount of the crude rhodanide in aqueous solution such that the concentration of this treated solution remains substantially constant throughout the continuous reaction. When carried out in this continuous manner, the recovered crystallized sodium rhodanide is completely free of thiourea.

EXAMPLE 4

A 30% by weight aqueous solution of calcium rhodanide, which is contaminated with 1500 p.p.m. of thiourea, is heated in an autoclave at 180° C. and maintained at this temperature for a period of 30 minutes so as to result in a pressure of 7.5 kg./cm.$^2$ (gauge). The resulting reaction solution and the mother liquor are then worked up as described in Example 1. The solid calcium rhodanide recovered in this manner contains only 6 p.p.m. of thiourea.

Similar results are achieved as in the foregoing examples when treating potassium rhodanide or barium rhodanide contaminated with approximately the same amounts of thiourea. In general, it is possible to reduce the thiourea content from relatively high concentrations down to less than 10 p.p.m. (with reference to the pure rhodanide) and in many instances, the content of thiourea is reduced below 5 p.p.m. and even to such an extent that the purified product may be considered as being substantially free of the thiourea impurity. This substantial removal of the thiourea, i.e. without leaving a residue of other undesirable reaction products, greatly enhances the known utility of the desired rhodanide products, particularly where sulfur-containing impurities must be avoided as harmful contaminants or poisons and for this reason cannot be tolerated in the rhodanide product. Since the reaction can be controlled to avoid decomposition of the rhodanide product, there is substantially no loss of the original yield even though the final product is obtained in a highly purified form.

The invention is hereby claimed as follows:

1. A process for reducing the thiourea content of an alkali or alkaline earth metal rhodanide which comprises heating said rhodanide containing the thiourea as an impurity in an aqueous solution at elevated pressure and at a temperature of about 170° to 200° C. for a period of up to about 45 minutes.

2. A process as claimed in claim 1 wherein said rhodanide is selected from the class consisting of sodium, potassium, calcium and barium rhodanides.

3. A process as claimed in claim 2 wherein the rhodanide is heated at said pressure and temperature for a period of about 15 to 45 minutes.

4. A process as claimed in claim 1 wherein the pressure is at least equal to the saturation pressure of the aqueous rhodanide solution being treated.

5. A process as claimed in claim 1 wherein the rhodanide is sodium rhodanide.

6. A process as claimed in claim 1 wherein the rhodanide is calcium rhodanide.

7. A process as claimed in claim 1 wherein the rhodanide is barium rhodanide.

8. A process as claimed in claim 1 wherein the aqueous solution of said rhodanide is conducted continuously through a reaction zone maintained at said elevated pressure and temperature and is then continuously expanded to drive off the hydrolysis products formed during the heating step.

9. A process as claimed in claim 4 wherein said rhodanide is selected from the class consisting of sodium, potassium, calcium and barium rhodanides.

References Cited

UNITED STATES PATENTS 1,932,819 10/1933 Hansen _____ 23—75
1,958,209  5/1934 Scott _____ 23—75

OSCAR R. VERTIZ, Primary Examiner

H. S. MILLER, Assistant Examiner

U.S. Cl. X.R.

423—204, 366